United States Patent
Bodduru et al.

(10) Patent No.: US 9,930,504 B2
(45) Date of Patent: Mar. 27, 2018

(54) REDUCING CALL FAILURE RATE IN MULTI-SUBSCRIBER IDENTITY MODULE CAPABLE DEVICES

(71) Applicant: QUALCOMM Incorporated, San Diego, CA (US)

(72) Inventors: Appala Naga Raju Bodduru, Hyderabad (IN); Onkar Nath Upadhyay, Hyderabad (IN); Venkata Krishna Murthy Jayavarapu, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/810,848

(22) Filed: Jul. 28, 2015

(65) Prior Publication Data

US 2017/0034677 A1    Feb. 2, 2017

(51) Int. Cl.
*H04W 4/16* (2009.01)
*H04W 76/02* (2009.01)
(Continued)

(52) U.S. Cl.
CPC .............. *H04W 4/16* (2013.01); *H04W 4/22* (2013.01); *H04W 24/02* (2013.01);
(Continued)

(58) Field of Classification Search
CPC ..... H04W 4/22; H04W 76/007; H04W 48/18; H04W 88/06; H04W 48/16; H04W 36/28;
(Continued)

(56) References Cited

U.S. PATENT DOCUMENTS

| 8,068,808 | B2 | 11/2011 | Smith |
| 8,805,444 | B2 | 8/2014 | Han et al. |

(Continued)

FOREIGN PATENT DOCUMENTS

| WO | 2012097002 A1 | 7/2012 |
| WO | 2014090340 A1 | 6/2014 |
| WO | 2015024596 A1 | 2/2015 |

OTHER PUBLICATIONS

Vodafone et al: "Emergency registration 1-5, in HPLMN", 3GPP Draft; C1-102900-Emergency-REG-HPLMN-24229-A00, 3rd Generation Partnership Project (3GPP), Mobile Competence Centre ; 650, Route Des Lucioles ; F-06921 Sophia-Antipolis Cedex; France vol. CT WGI, No. Xian; 20100702, Aug. 13, 2010 (Aug. 13, 2010), XP050443696, paragraph 5.1.6.1.
International Search Report and Written Opinion—PCT/US2016/044083—ISA/EPO—Dec. 19, 2016.

*Primary Examiner* — Nam Huynh
(74) *Attorney, Agent, or Firm* — Procopio, Cory, Hargreaves & Savitch LLP

(57) ABSTRACT

A method for reducing call failure rates on a multi-subscriber identity module (SIM) mobile communication device includes: selecting a first SIM camped on a visiting public land mobile network (VPLMN); attempting call initiation on the first SIM; determining whether call setup on the first SIM on the VPLMN is successful; in response to determining that the call setup on the first SIM is unsuccessful, determining if a second SIM is camped on a home public land mobile network (HPLMN); and in response to determining that the second SIM is camped on the HPLMN, selecting the second SIM camped on the HPLMN; and attempting call initiation using the second SIM.

10 Claims, 6 Drawing Sheets

(51) Int. Cl.
   *H04W 24/02* (2009.01)
   *H04W 4/22* (2009.01)
   *H04W 84/04* (2009.01)
   *H04W 8/18* (2009.01)
   *H04W 48/18* (2009.01)
   *H04W 60/00* (2009.01)
   *H04W 76/00* (2018.01)

(52) U.S. Cl.
   CPC .......... *H04W 76/027* (2013.01); *H04W 8/183* (2013.01); *H04W 48/18* (2013.01); *H04W 60/005* (2013.01); *H04W 76/007* (2013.01); *H04W 84/042* (2013.01)

(58) Field of Classification Search
   CPC .......... H04L 63/0853; H04M 1/72536; H04M 2242/04
   See application file for complete search history.

(56) References Cited

U.S. PATENT DOCUMENTS

| | | | |
|---|---|---|---|
| 2007/0129103 A1* | 6/2007 | Al-Shaikh | H04M 1/72522 455/551 |
| 2007/0265005 A1 | 11/2007 | Sitch | |
| 2010/0240338 A1* | 9/2010 | Mallick | H04L 12/5691 455/404.1 |
| 2012/0142308 A1 | 6/2012 | Lee | |
| 2014/0024331 A1* | 1/2014 | Hsu | H04W 36/28 455/404.1 |
| 2014/0274006 A1 | 9/2014 | Mutya et al. | |
| 2014/0378084 A1 | 12/2014 | Preteseille et al. | |
| 2015/0065132 A1 | 3/2015 | Ramkumar | |
| 2015/0281929 A1* | 10/2015 | Shih | H04W 4/22 455/404.1 |

\* cited by examiner

REDUCING CALL FAILURE RATE IN MULTI-SUBSCRIBER IDENTITY MODULE CAPABLE DEVICES

BACKGROUND

Emergency calls on a subscription may fail for various reasons. For example, the core network may reject the call. Failures causes, for example, IMSI UNKNOWN IN VLR/ILLEGAL ME can happen at the mobile switching center (MSC) while setting up the call. These failures may occur when the mobile communication device is initiating a call on the visiting public land mobile network (VPLMN).

In some countries, networks mandate that an international mobile subscriber identity (IMSI) be used for the emergency call. Further, a network may reject the emergency call if the IMSI does not belong to the network home location register (HLR) database.

In case of failure, the mobile communication device will retry the emergency call on the same subscription multiple times, either immediately or after certain time with no guarantee of success.

SUMMARY

Apparatuses and methods for reducing call failure rates in multi-SIM capable mobile communication devices are provided.

According to various embodiments there is provided a method for reducing call failure rates on a multi-subscriber identity module (SIM) mobile communication device. In some embodiments, the method may include: selecting a first SIM camped on a visiting public land mobile network (VPLMN); attempting call initiation on the first SIM; determining whether call setup on the first SIM on the VPLMN is successful; in response to determining that the call setup on the first SIM is unsuccessful, determining if a second SIM is camped on a home public land mobile network (HPLMN); and in response to determining that the second SIM is camped on the HPLMN, selecting the second SIM camped on the HPLMN; and attempting call initiation using the second SIM.

According to various embodiments there is provided a method for initiating a call on a multi-subscriber identity module (SIM) mobile communication device. In some embodiments, the method may include: determining whether at least one of a plurality of SIMs is camped on a home public land mobile network (HPLMN); in response to determining that at least one of the plurality of SIMs is camped on the HPLMN, selecting the at least one SIM; and attempting call initiation using the selected SIM camped on the HPLMN.

According to various embodiments there is provided a method for initiating a call on a multi-subscriber identity module (SIM) mobile communication device. In some embodiments, the method may include: determining whether at least one of a plurality of SIMs is camped on a home public land mobile network (HPLMN); in response to determining that at least one of the plurality of SIMs is camped on the HPLMN, providing a notification that an HPLMN is available; in response to the notification that an HPLMN is available, receiving a selection of the at least one of a plurality of SIMs camped on the HPLMN; and attempting call initiation using the selected SIM camped on the HPLMN.

According to various embodiments there is provided a mobile communication device. In some embodiments, the mobile communication device may include: a communication unit configured to communicate with at least one communication network; and a control unit.

The control unit may be configured to: select a first SIM camped on a visiting public land mobile network (VPLMN); cause the communication unit to attempt call initiation on the first SIM; determine whether call setup on the first SIM on the VPLMN is successful; in response to determining that the call setup on the first SIM is unsuccessful, determine if a second SIM is camped on a home public land mobile network (HPLMN); and in response to determining that the second SIM is camped on the HPLMN, select the second SIM camped on the HPLMN and cause the communication unit to attempt call initiation using the second SIM.

Other features and advantages of the present inventive concept should be apparent from the following description which illustrates by way of example aspects of the present inventive concept.

BRIEF DESCRIPTION OF THE DRAWINGS

Aspects and features of the present inventive concept will be more apparent by describing example embodiments with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Figure 1A:
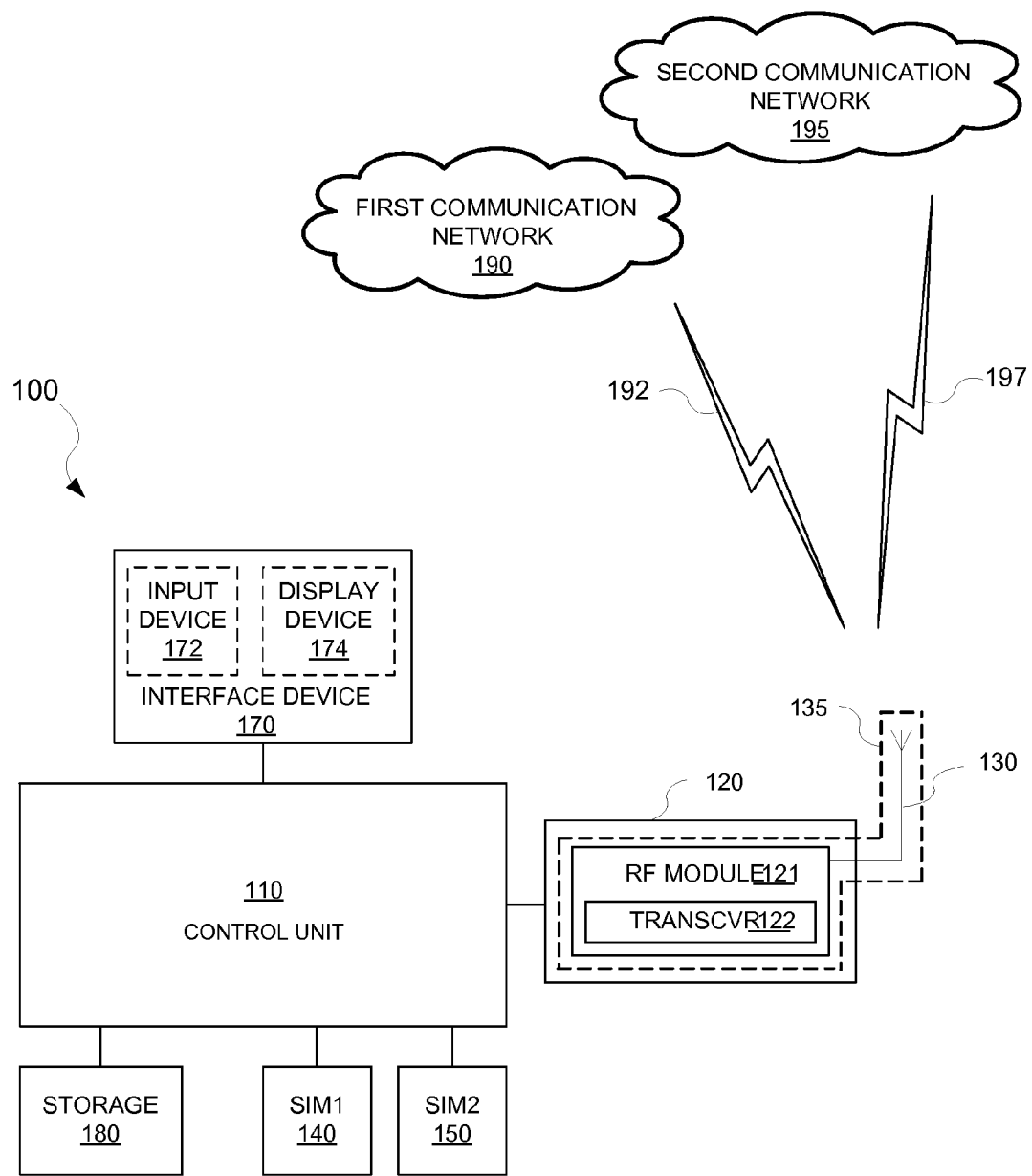
FIG. 1A is a block diagram illustrating a mobile communication device according to various embodiments.

FIG. 1A is a block diagram illustrating a mobile communication device 100 according to various embodiments. As illustrated in FIG. 1A, the mobile communication device 100 may include a control unit 110, a communication unit 120, an antenna 130, a first SIM 140, a second SIM 150, an interface device 170, and a storage unit 180.

The mobile communication device 100 may be, for example but not limited to, a mobile telephone, smartphone, tablet, computer, etc., capable of communications with one or more wireless networks. One of ordinary skill in the art will appreciate that the mobile communication device 100 may include one or more transceivers (communications units) and may interface with one or more antennas without departing from the scope of the present inventive concept.

The communication unit 120 may include, for example, but not limited to, one or more radio frequency (RF) modules 121. The RF module 121 may include, for example, but not limited to the first transceiver 122. An RF chain 135 may include, for example, but not limited to the antenna 130 and the RF module 121.

One of ordinary skill in the art will appreciate that embodiments of the mobile communication device 100 may include more than one communication unit and/or more than one antenna without departing from the scope of the present inventive concept.

A SIM (for example the first SIM 140 and/or the second SIM 150) in various embodiments may be a Universal Integrated Circuit Card (UICC) that is configured with SIM and/or universal SIM (USIM) applications, enabling access to global system for mobile communications (GSM) and/or universal mobile telecommunications system (UMTS) networks. The UICC may also provide storage for a phone book and other applications. Alternatively, in a Code Division Multiple Access (CDMA) network, a SIM may be a UICC removable user identity module (R-UIM) or a CDMA subscriber identity module (CSIM) on a card. A SIM card may have a CPU, ROM, RAM, EEPROM and I/O circuits. An Integrated Circuit Card Identity (ICCID) SIM serial number may be printed on the SIM card for identification. However, a SIM may be implemented within a portion of memory of the mobile communication device 100, and thus need not be a separate or removable circuit, chip, or card.

A SIM used in various embodiments may store user account information, an IMSI, a set of SIM application toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home PLMN (HPLMN) code, etc.) to indicate the SIM card network operator provider.

The first SIM 140 may associate the communication unit 120 with a first subscription (Sub1) 192 associated with a first radio access technology (RAT) on a first communication network 190 and the second SIM 150 may associate the communication unit 120 with a second subscription (Sub2) 197 associated with a second RAT on a second communication network 195. When a RAT is active, the communication unit 120 receives and transmits signals on the active RAT. When a RAT is idle, the communication unit 120 receives but does not transmit signals on the idle RAT.

For convenience, the various embodiments are described in terms of dual-SIM, dual-standby (DSDS) mobile communication devices. However, one of ordinary skill in the art will appreciate that the present inventive concept may be extended to Multi-SIM Multi-Standby (MSMS) and/or Multi-SIM Multi-Active (MSMA) mobile communication devices without departing from the scope of protection.

The first communication network 190 and the second communication network 195 may be operated by the same or different service providers, and/or may support the same or different RATs, for example, but not limited to, GSM, CDMA, WCDMA, and Long Term Evolution (LTE).

The interface device 170 may include an input device 172, for example, but not limited to a keyboard, touch panel, or other human interface device, and a display device 174, for example, but not limited to, a liquid crystal display (LCD), light emitting diode (LED) display, or other video display. One of ordinary skill in the art will appreciate that other input and display devices may be used without departing from the scope of the present inventive concept.

The control unit 110 may be configured to control overall operation of the mobile communication device 100 including control of the communication unit 120, the interface device 170, and the storage unit 180. The control unit 110 may be a programmable device, for example, but not limited to, a microprocessor (e.g., general-purpose processor, baseband modem processor, etc.) or microcontroller.

The storage unit 180 may be configured to store operating systems and/or application programs for operation of the mobile communication device 100 that are executed by the control unit 110, as well as to store application data and user data.

Figure 1B:
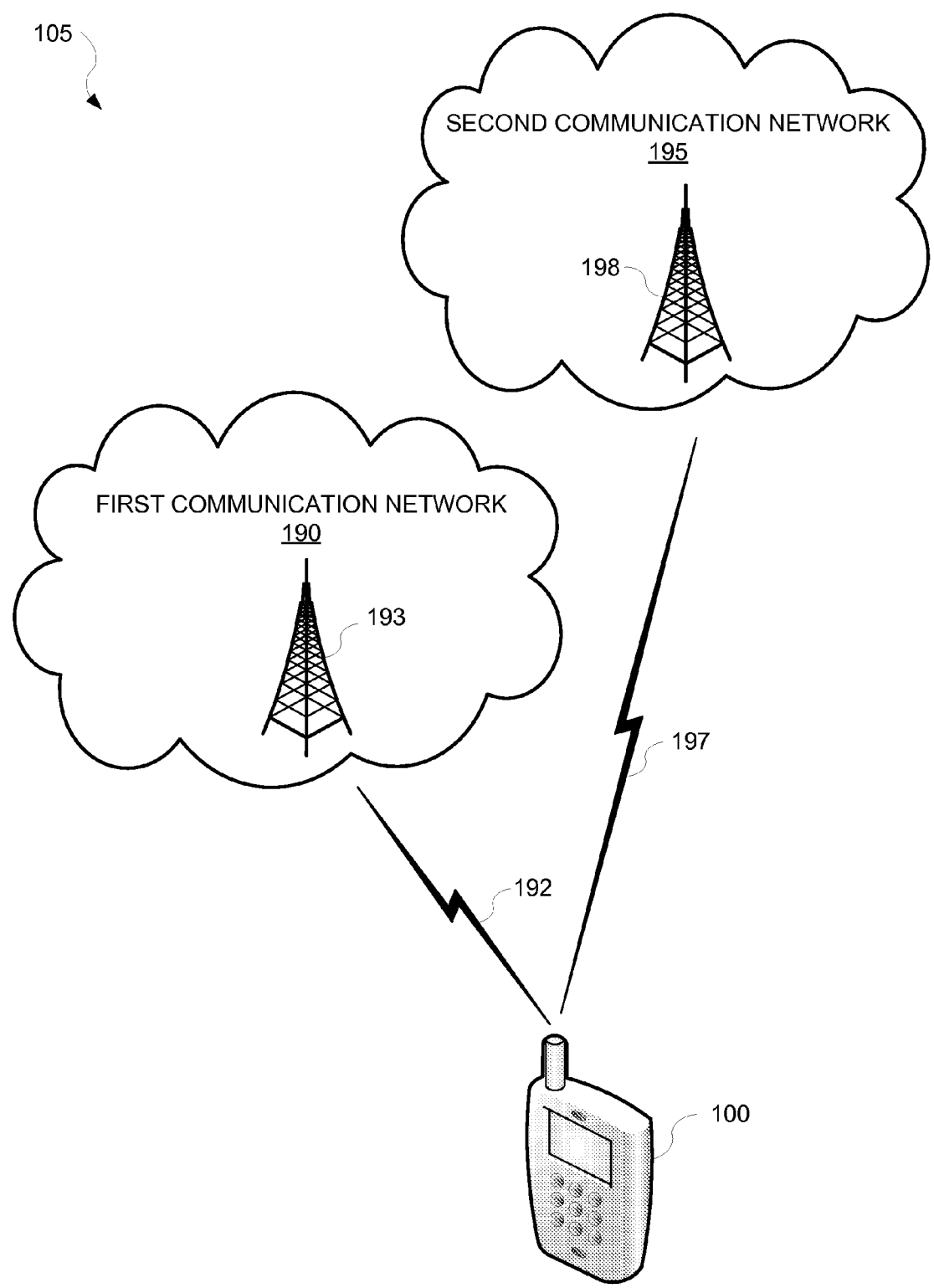
FIG. 1B is a diagram illustrating a network environment for various embodiments.

FIG. 1B is a diagram illustrating a network environment 105 for various embodiments. Referring to FIGS. 1A and 1B, a mobile communication device 100 may be configured to communicate with a first communication network 190 on a first subscription 192 and a second communication network 195 on a second subscription 197. One of ordinary skill in the art will appreciate that the mobile communication device may configured to communicate with more than two communication networks and may communicate on more than two subscriptions without departing from the scope of the inventive concept.

The first communication network 190 and the second communication network 195 may implement the same or different radio access technologies (RATs). For example, the first communication network 190 may be a GSM network and the first subscription 192 may be a GSM subscription. The second communication network 195 may also be a GSM network. Alternatively, the second communication network 195 may implement another RAT including, for example, but not limited to, LTE, Wideband Code Division Multiple Access (WCDMA), and Time Division-Synchronous Code Division Multiple Access (TD-SCDMA).

The first communication network 190 may include one or more base transceiver stations (BTSs) including, for example, but not limited to, a first BTS 193. The second communication network 195 may also include one or more BTSs, including, for example, but not limited to, a second BTS 198. A person having ordinary skill in the art will appreciate that the network environment 105 may include any number of communication networks, mobile communication devices, and BTSs without departing from the scope of the present inventive concept.

The mobile communication device 100 may attempt to acquire the first communication network 190 and camp on the first BTS 193. The mobile communication device 100 may also attempt to acquire the second communication network 195 and camp on the second BTS 198. A person having ordinary skill in the art will appreciate that the acquisition of the first communication network 190 performed on the first subscription 192 may be independent of the acquisition of the second communication network 195 performed on the second subscription 197. Furthermore, the mobile communication device 100 may attempt to acquire the first communication network 190 on the first subscription 192 and the second communication network 195 on the second subscription 197.

Figure 2:
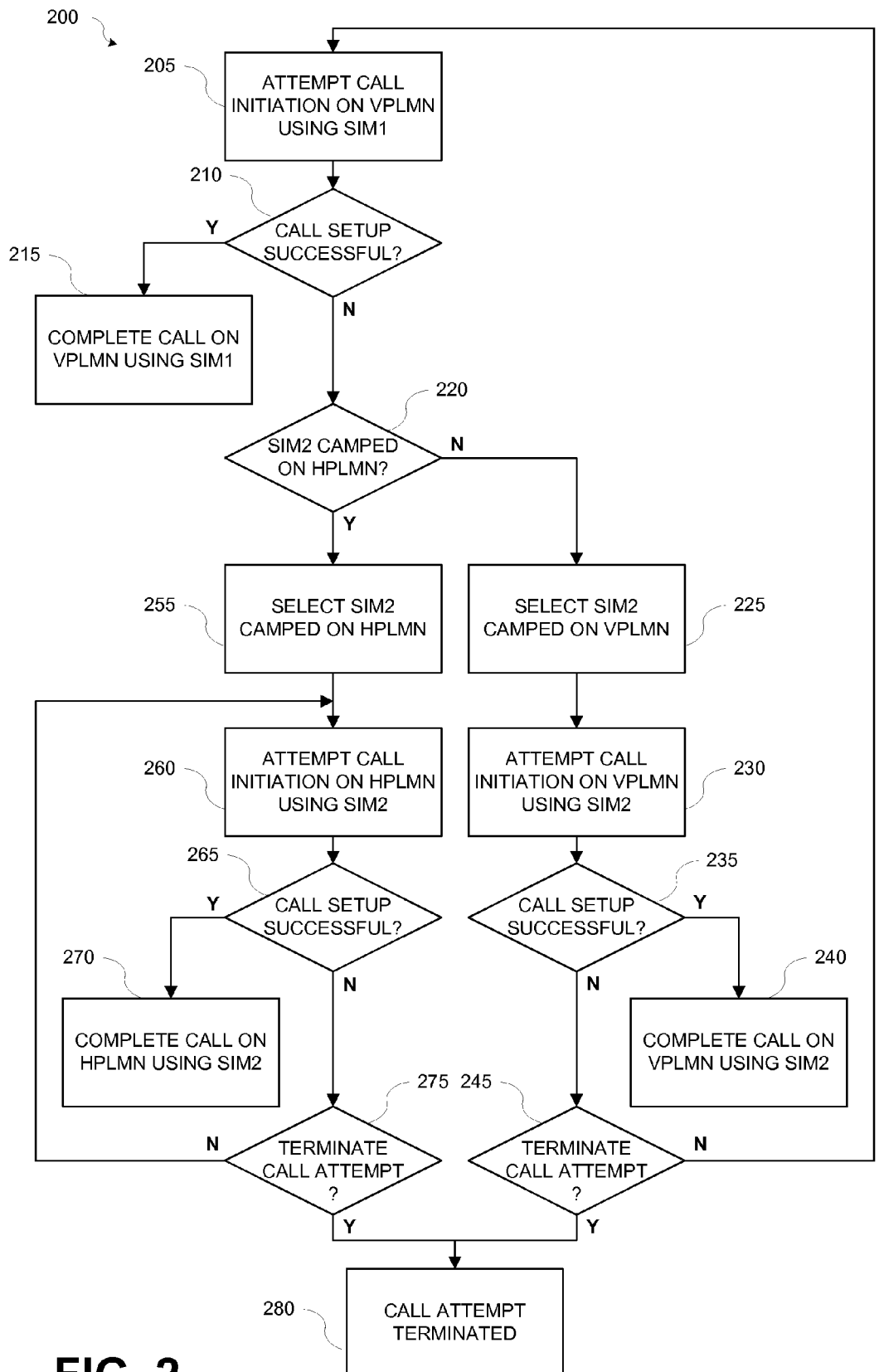
FIG. 2 is a flowchart illustrating a method for reducing call failure rates according to various embodiments.

FIG. 2 is a flowchart illustrating a method 200 for reducing call failure rates according to various embodiments. Referring to FIGS. 1A-2, the control unit 110 may cause the communication unit 120 to attempt a call initiation on a VPLMN (e.g., the first communication network 190) using the first SIM 140 camped on the VPLMN (205). The attempted call may be, for example, but not limited to, an emergency call. The control unit 110 may determine whether call setup on the VPLMN was successful (210). In response to determining that the call setup was successful (210-Y), the control unit 110 may cause the mobile communication device 100 to complete the call on the VPLMN using the first SIM 140 (215).

In response to determining that the call setup on the VPLMN was not successful (210-N), the control unit 110 may determine whether the second SIM 150 is camped on an HPLMN (e.g., the second communication network 195) 220. In response to determining that the second SIM 150 is not camped on the HPLMN (220-N), the control unit 110 may still select the second SIM 150 camped on a VPLMN (225). For example, the second SIM 150 may be camped on the first communication network 190 or another VPLMN.

The control unit 110 may cause the communication unit 120 to attempt the call initiation on the VPLMN using the second SIM 150 (230). The control unit 110 may determine whether call setup on the VPLMN was successful (235). In response to determining that the call setup was successful (235-Y), the control unit 110 may cause the mobile communication device 100 to complete the call on the VPLMN using the second SIM 150 (240). In response to determining that the call setup on the VPLMN was not successful (235-N), the control unit 110 may determine whether an instruction to terminate the call attempt has been received (245). For example, the control unit 110 may determine whether an instruction to terminate the call attempt has been received from the input device 172 of the interface device 170.

In response to determining that an instruction to terminate the call attempt has been received (245-Y), the control unit 110 may cause the communication unit 120 to terminate the call attempt (280). In response to determining that an instruction to terminate the call attempt has not been received (245-N), the method 200 may continue at operation 205 and the control unit 110 may cause the communication unit 120 to again attempt to initiate the call on the VPLMN using the first SIM 140.

In response to determining that the second SIM 150 is camped on the HPLMN (220-Y), the control unit 110 may select the second SIM 150 camped on the HPLMN (255). The control unit 110 may cause the communication unit 120 to attempt the call initiation on the HPLMN using the second SIM 150 (260). The control unit 110 may determine whether call setup on the HPLMN was successful (265). In response to determining that the call setup was successful (265-Y), the control unit 110 may cause the mobile communication device 100 to complete the call on the HPLMN using the second SIM 150 (270).

In response to determining that the call setup on the HPLMN was not successful (265-N), the control unit 110 may determine whether an instruction to terminate the call attempt has been received (275). For example, the control unit 110 may determine whether an instruction to terminate the call attempt has been received from the input device 172 of the interface device 170.

In response to determining that an instruction to terminate the call attempt has been received (275-Y), the control unit 110 may cause the communication unit 120 to terminate the call attempt (280). In response to determining that an instruction to terminate the call attempt has not been received (275-N), the method may continue at operation 260, and the control unit 110 may cause the communication unit 120 to again attempt to initiate the call on the HPLMN using the second SIM 150.

Figure 3:
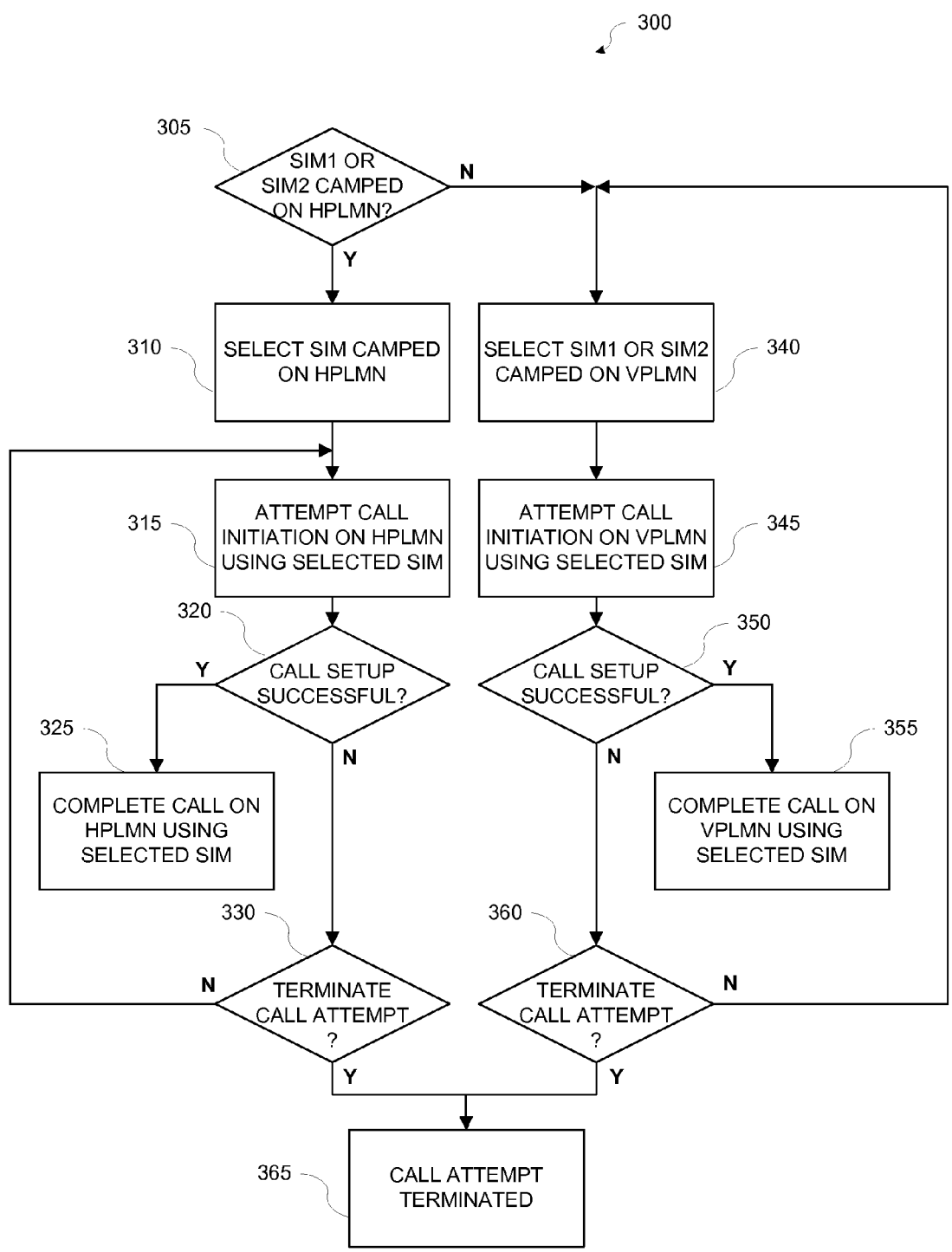
FIG. 3 is flowchart illustrating a method for reducing call failure rates according to various embodiments.

FIG. 3 is flowchart illustrating a method 300 for reducing call failure rates according to various embodiments. Referring to FIGS. 1A-3, the control unit 110 may determine whether one of the first SIM (e.g., the first SIM 140) or the second SIM (e.g., the second SIM 150) is camped on an HPLMN (e.g., the second communication network 195) (305). In response to determining that one of the first SIM 140 or the second SIM 150 is not camped on an HPLMN (305-N), the control unit 110 may select one of the first SIM 140 or the second SIM 150 camped on a VPLMN (e.g., the first communication network 190 or another communication network) (340). The control unit 110 may cause the communication unit 120 to attempt a call initiation on the VPLMN using the selected SIM camped on the VPLMN (345). The attempted call may be, for example, but not limited to, an emergency call.

The control unit 110 may determine whether call setup on the VPLMN was successful (350). In response to determining that the call setup was successful (350-Y), the control unit 110 may cause the mobile communication device 100 to complete the call on the VPLMN using the selected SIM (355). In response to determining that the call setup on the VPLMN was not successful (355-N), the control unit 110 may determine whether an instruction to terminate the call attempt has been received (360). For example, the control unit 110 may determine whether an instruction to terminate the call attempt has been received from the input device 172 of the interface device 170.

In response to determining that an instruction to terminate the call attempt has been received (360-Y), the control unit 110 may cause the communication unit 120 to terminate the call attempt (365). In response to determining that an instruction to terminate the call attempt has not been received (360-N), the method 300 may continue at operation 340, and the control unit 110 may select one of the first SIM 140 or the second SIM 150 camped on a VPLMN. The control unit 110 may select a SIM other than the SIM selected for the immediately preceding unsuccessful call attempt.

Alternatively, the control unit 110 may determine at operation 305 that one of the first SIM 140 or the second SIM 150 is camped on an HPLMN (305-Y). The control unit 110 may select the SIM camped on the HPLMN (310) and cause the communication unit 120 to attempt a call initiation on the HPLMN using the selected SIM (315). The control unit 110 may determine whether call setup on the HPLMN was successful (320). In response to determining that the call setup was successful (320-Y), the control unit 110 may cause the mobile communication device 100 to complete the call on the HPLMN using the selected SIM (325).

In response to determining that the call setup was not successful on the HPLMN (320-N), the control unit 110 may determine whether an instruction to terminate the call attempt has been received (330). For example, the control unit 110 may determine whether an instruction to terminate the call attempt has been received from the input device 172 of the interface device 170.

In response to determining that an instruction to terminate the call attempt has been received (330-Y), the control unit 110 may cause the communication unit 120 to terminate the call attempt (365). In response to determining that an instruction to terminate the call attempt has not been received (330-N), the method may continue at operation 315 and the control unit 110 may cause the communication unit 120 to again attempt to initiate the call on the HPLMN using the selected SIM.

Figure 4:
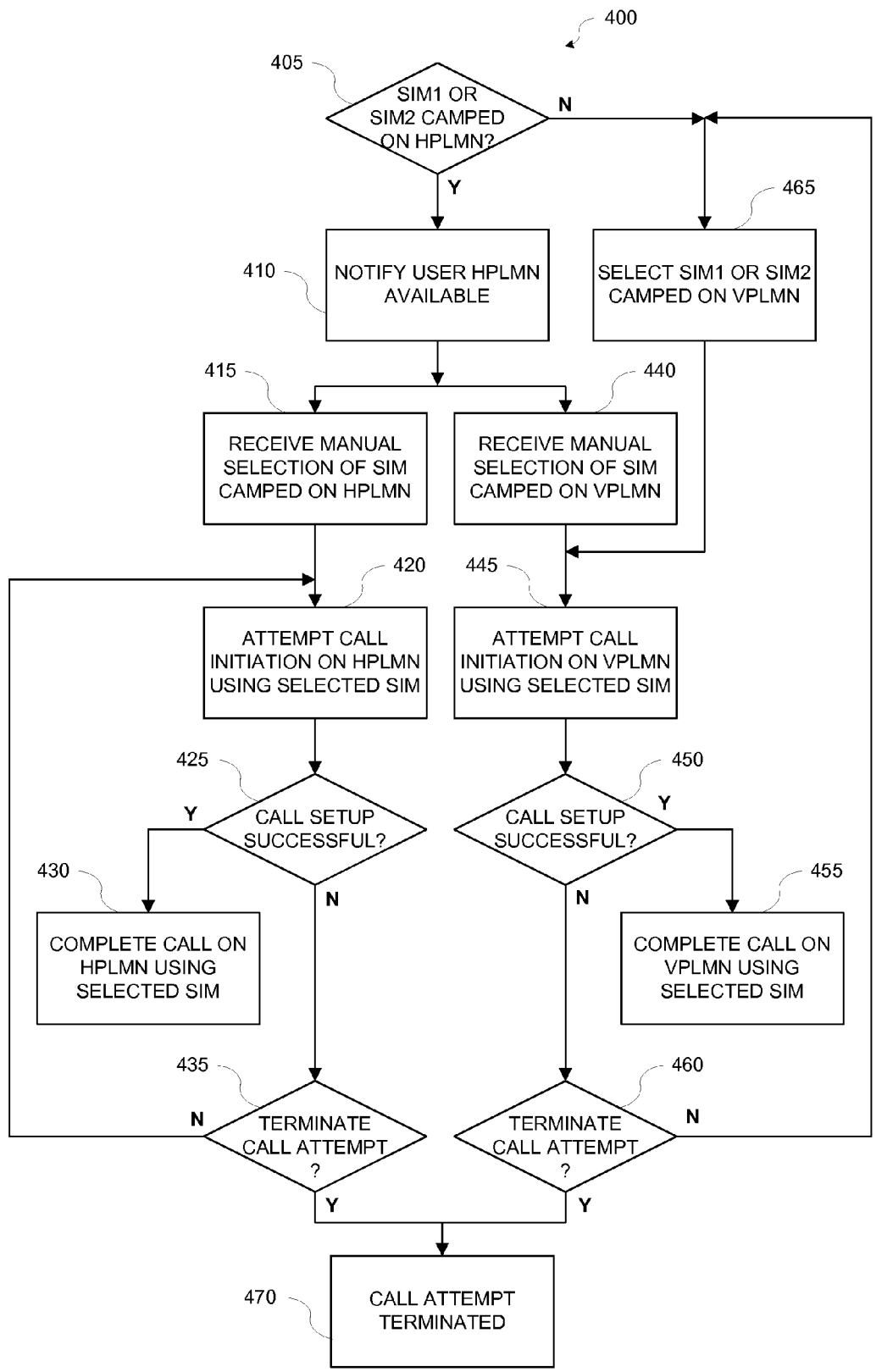
FIG. 4 is flowchart illustrating a method for reducing call failure rates according to various embodiments.

FIG. 4 is flowchart illustrating a method 400 for reducing call failure rates according to various embodiments. Referring to FIGS. 1A-4, the control unit 110 may determine whether one of the first SIM (e.g., the first SIM 140) or the second SIM (e.g., the second SIM 150) is camped on an HPLMN (e.g., the second communication network 195) (305). In response to determining that one of the first SIM 140 or the second SIM 150 is camped on an HPLMN (405-Y), the control unit 110 may cause the mobile communication device 100 to provide a notification that the HPLMN is available (410). For example, the control unit 110 may provide a notification that the HPLMN is available via the display device 174 of the interface device 170.

In response to the notification that the HPLMN is available, a manual selection of the SIM camped on the HPLMN may be received (415). For example, the control unit 110 may determine that an instruction to select the SIM camped on the HPLMN has been received from the input device 172 of the interface device 170. The control unit 110 may cause the communication unit 120 to attempt a call initiation on the HPLMN using the selected SIM (420). The attempted call may be, for example, but not limited to, an emergency call.

The control unit 110 may determine whether call setup on the HPLMN was successful (425). In response to determining that the call setup was successful (425-Y), the control unit 110 may cause the mobile communication device 100 to complete the call on the HPLMN using the selected SIM (430). In response to determining that the call setup was not successful on the HPLMN (425-N), the control unit 110 may determine whether an instruction to terminate the call attempt has been received (435). For example, the control unit 110 may determine whether an instruction to terminate the call attempt has been received from the input device 172 of the interface device 170.

In response to determining that an instruction to terminate the call attempt has been received (435-Y), the control unit 110 may cause the communication unit 120 to terminate the call attempt (470). In response to determining that an instruction to terminate the call attempt has not been received (435-N), the method 400 may continue at operation 420 and the control unit 110 may cause the communication unit 120 to again attempt to initiate the call on the HPLMN using the selected SIM.

Alternatively, in response to the notification that the HPLMN is available at operation 410, a manual selection of the SIM camped on the VPLMN may be received (440). For example, the control unit 110 may determine that an instruction to select the SIM camped on the VPLMN has been received from the input device 172 of the interface device 170. The control unit 110 may cause the communication unit 120 to attempt a call initiation on the VPLMN using the selected SIM (445). The attempted call may be, for example, but not limited to, an emergency call.

The control unit 110 may determine whether call setup on the VPLMN was successful (450). In response to determining that the call setup was successful (450-Y), the control unit 110 may cause the mobile communication device 100 to complete the call on the VPLMN using the selected SIM (455). In response to determining that the call setup on the VPLMN was not successful (450-N), the control unit 110 may determine whether an instruction to terminate the call attempt has been received (460). For example, the control unit 110 may determine whether an instruction to terminate the call attempt has been received from the input device 172 of the interface device 170.

In response to determining that an instruction to terminate the call attempt has been received (460-Y), the control unit 110 may cause the communication unit 120 to terminate the call attempt (470). In response to determining that an instruction to terminate the call attempt has not been received (460-N), the method 400 may continue at operation 465 and the control unit 110 may select one of the first SIM 140 or the second SIM 150 camped on the VPLMN. The control unit 110 may select a SIM other than the SIM selected for the immediately preceding unsuccessful call attempt.

Alternatively, at operation 405, in response to determining that one of the first SIM 140 or the second SIM 150 is not camped on the HPLMN (405-N), the control unit 110 may select one of the first SIM 140 or the second SIM 150 camped on the VPLMN (465). The control unit 110 may cause the communication unit 120 to attempt a call initiation on the VPLMN using the selected SIM (445). The attempted call may be, for example, but not limited to, an emergency call.

The control unit 110 may determine whether call setup on the VPLMN was successful (450). In response to determining that the call setup was successful (450-Y), the control unit 110 may cause the mobile communication device 100 to complete the call on the VPLMN using the selected SIM (455). In response to determining that the call setup on the VPLMN was not successful (450-N), the control unit 110 may determine whether an instruction to terminate the call attempt has been received (460). For example, the control unit 110 may determine whether an instruction to terminate the call attempt has been received from the input device 172 of the interface device 170.

In response to determining that an instruction to terminate the call attempt has been received (460-Y), the control unit 110 may cause the communication unit 120 to terminate the call attempt (470). In response to determining that an instruction to terminate the call attempt has not been received (460-N), the method 400 may continue at operation 465 and the control unit 110 may select one of the first SIM 140 or the second SIM 150 camped on the VPLMN. The control unit 110 may select a SIM other than the SIM selected for the immediately preceding unsuccessful call attempt.

Figure 5:
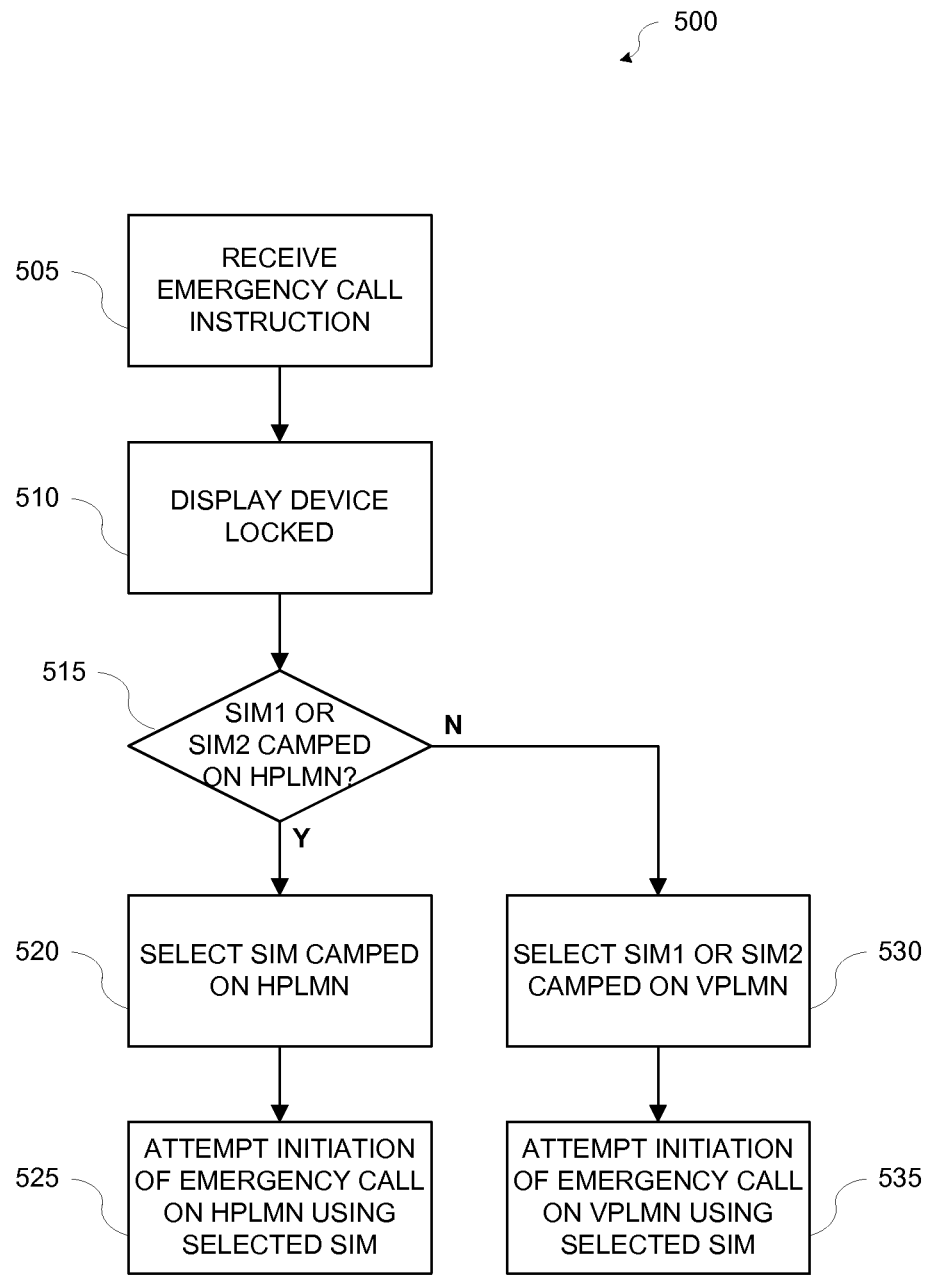
FIG. 5 is flowchart illustrating a method for reducing call failure rates for emergency calls when the mobile communication device display is locked according to various embodiments.

FIG. 5 is flowchart illustrating a method 500 for reducing call failure rates for emergency calls when the mobile communication device 100 display is locked according to various embodiments. Referring to FIGS. 1A-5, the control unit 110 may receive an instruction to initiate an emergency call (505). For example, the control unit 110 may determine whether an instruction to initiate an emergency call has been received from the input device 172 of the interface device 170. The control unit 110 may determine that the display device 174, for example, a display screen, of the interface device 170 is locked (510). With the display device 174 locked, the capability of the communication unit 120 to initiate all but an emergency call may be inhibited. An emergency call may be a call placed to a police emergency number, for example 911, or may be placed to another predefined telephone number stored (e.g., in the storage unit 180 or other storage) as an emergency telephone number.

The control unit 110 may determine whether one of the first SIM (e.g., the first SIM 140) or the second SIM (e.g., the second SIM 150) is camped on an HPLMN (e.g., the second communication network 195) (515). In response to determining that one of the first SIM 140 or the second SIM 150 is camped on an HPLMN (515-Y), the control unit 110 may select the SIM camped on the HPLMN (520). The control unit 110 may cause the communication unit 120 to attempt a call initiation of the emergency call on the HPLMN using the selected SIM (525).

Alternatively, in response to determining that one of the first SIM 140 or the second SIM 150 is not camped on the HPLMN (515-N), the control unit 110 may select one of the first SIM 140 or the second SIM 150 camped a VPLMN (530). The control unit 110 may cause the communication unit 120 to attempt a call initiation of the emergency call on the VPLMN using the selected SIM (535).

The methods 200, 300, 400, and 500 described with respect to FIGS. 2, 3, 4, and 5, respectively, may be embodied on a non-transitory computer readable medium, for example, but not limited to, the storage unit 180 or other non-transitory computer readable medium known to those of skill in the art, having stored therein a program including computer executable instructions for making a processor, computer, or other programmable device execute the operations of the methods.

While the above embodiments have been described in terms of a dual-SIM mobile communication device (i.e., a first SIM and a second SIM), one of ordinary skill in the art will appreciate that the inventive concept may be extended to embodiments including more than two SIMs (i.e., multi-SIM mobile communication devices) without departing from the scope of the present inventive concept.

The accompanying claims and their equivalents are intended to cover such forms or modifications as would fall within the scope and spirit of the protection. For example, the example apparatuses, methods, and systems disclosed herein can be applied to multi-SIM wireless devices subscribing to multiple communication networks and/or communication technologies. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc., are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for reducing call failure rates on a multi-subscriber identity module (SIM) mobile communication device, the method comprising:
   selecting a first SIM camped on a visiting public land mobile network (VPLMN);
   attempting call initiation on the first SIM;
   determining whether call setup on the first SIM on the VPLMN is successful;
   in response to determining that the call setup on the first SIM is unsuccessful, determining if a second SIM is camped on a home public land mobile network (HPLMN); and
   in response to determining that the second SIM is camped on the HPLMN:

selecting the second SIM camped on the HPLMN;
attempting call initiation using the second SIM;
determining whether the call setup on the HPLMN using the second SIM is successful; and
in response to determining that the call setup on the HPLMN using the second SIM is successful, completing the call on the HPLMN using the second SIM.

2. The method of claim 1, further comprising:
determining whether the call setup on the HPLMN using the second SIM is successful;
in response to determining that the call setup on the HPLMN using the second SIM is unsuccessful, reattempting call initiation on the HPLMN using the second SIM.

3. The method of claim 1, further comprising:
in response to determining that the second SIM is camped on a VPLMN instead of the HPLMN:
selecting the second SIM camped on the VPLMN; and
attempting call initiation on the VPLMN using the second SIM.

4. The method of claim 3, wherein the first SIM and the second SIM are camped on a same VPLMN.

5. The method of claim 3, wherein the first SIM and the second SIM are camped on different VPLMNs.

6. A mobile communication device, comprising:
a communication unit configured to communicate with at least one communication network; and
a control unit configured to:
  select a first SIM camped on a visiting public land mobile network (VPLMN);
  cause the communication unit to attempt call initiation on the first SIM;
  determine whether call setup on the first SIM on the VPLMN is successful;
  in response to determining that the call setup on the first SIM is unsuccessful, determine if a second SIM is camped on a home public land mobile network (HPLMN);
  in response to determining that the second SIM is camped on the HPLMN, select the second SIM camped on the HPLMN and cause the communication unit to attempt call initiation using the second SIM;
  determine whether the call setup on the HPLMN using the second SIM is successful; and
  in response to determining that the call setup on the HPLMN using the second SIM is successful, complete the call on the HPLMN using the second SIM.

7. The mobile communication device of claim 6, wherein the control unit is further configured to:
in response to determining that the call setup on the HPLMN using the second SIM is unsuccessful, cause the communication unit to reattempt call initiation on the HPLMN using the second SIM.

8. The mobile communication device of claim 6, wherein the control unit is further configured to:
in response to determining that the second SIM is camped on a VPLMN, select the second SIM camped on the VPLMN and cause the communication unit to call initiation on the VPLMN using the second SIM.

9. The mobile communication device of claim 8, wherein the first SIM and the second SIM are camped on a same VPLMN.

10. The mobile communication device of claim 8, wherein the first SIM and the second SIM are camped on different VPLMNs.

* * * * *